Oct. 22, 1963    F. K. KELEMEN ET AL    3,108,178
CAPACITANCE DISCHARGE STUD WELDING APPARATUS
Filed Aug. 3, 1960
FIG.1
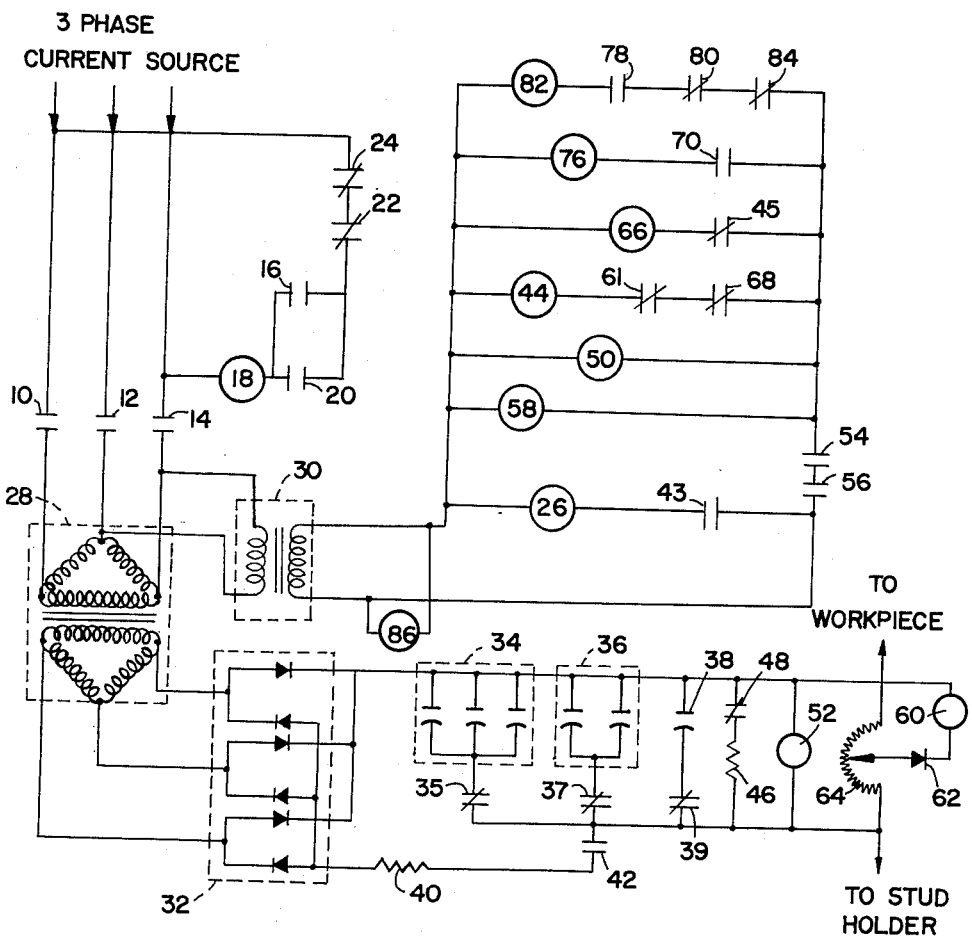
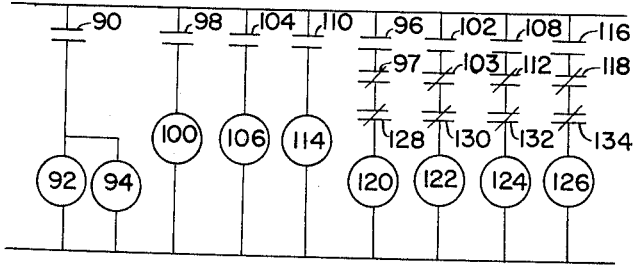
FIG. 2
INVENTORS
Frank K. Kelemen
Lawrence P. English
BY
Morse & Altman
Attorneys United States Patent Office 3,108,178
Patented Oct. 22, 1963

3,108,178
CAPACITANCE DISCHARGE STUD WELDING
APPARATUS
Frank K. Kelemen, Haddonfield, and Lawrence P. English, Haddon Heights, N.J., assignors to KSM Products, Inc., Merchantville, N.J., a corporation of New Jersey
Filed Aug. 3, 1960, Ser. No. 47,211
10 Claims. (Cl. 219—98)

This invention relates to stud welding apparatus and particularly to stud welding apparatus wherein the welding current is derived from the discharge of a capacitor.

In capacitance stud welding and apparatus therefor, the stud is biased into contact with a workpiece to which it is to be welded, and current from a capacitor is passed through the stud and workpiece to create an arc for fusing adjacent portions of the stud and workpiece. Heretofore it has been the usual practice to complete the welding circuit comprising the capacitor, stud and workpiece by closing a switch in the circuit between the stud and the capacitor. Switches in such circuits are required to carry relatively large current loads and, accordingly, are not only expensive but also represent a chronic source of trouble due to deterioration of the switch contacts.

An object of the invention is to provide, in stud welding apparatus comprising a welding circuit including a capacitor, stud-holding means and a ground for a workpiece to which the stud is to be welded, control means for operating the apparatus, which control means eliminates the necessity for a switch in the welding circuit for electrically coupling the stud and capacitor.

Another object of the invention is to provide, in capacitance discharge apparatus of the type described, novel and improved control means for automatically regulating and stabilizing the charge on the capacitor.

A further object of the invention is to provide, in capacitance discharge stud welding apparatus, control means of the type described characterized by simple and inexpensive construction and dependable and efficient operation.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a schematic diagram of the electrical circuit comprising the invention; and FIG. 2 is a schematic diagram of a portion of the electrical circuit of FIG. 1 illustrating another embodiment thereof.

The invention is illustrated in the form of a power supply and control circuit for a stationary production-type of stud welding device, as distinguished from a portable, hand-operated gun-type of welding device. Stud welding devices of this type generally include stud-holding means, means for clamping the workpiece, and a pneumatic system for operating the clamping means and causing the stud-holding means to move toward and away from the workpiece held by the clamping means. The basic components of pneumatic systems of this type usually include a pump, pistons and cylinders for moving the stud-holding and clamping means, and valves for regulating the flow of air to the cylinders. The operation of the valves is controlled electrically by a power supply and control circuit so as to properly coordinate the functions of both the electrical and the mechanical components of the apparatus to effect stud welding operations substantially automatically.

Reference is now made to FIG. 1 of the drawing, wherein there is shown the electrical components of a circuit for supplying power for welding and for controlling the functioning of the mechanical components of the welding apparatus and the electrical components of the welding current power supply so that welding operations performed by the apparatus are substantially automatic. The power supply and control circuit is illustrated in an inoperative condition prior to the commencement of a welding cycle. The circuit is powered from a conventional, three-phase, alternating current source and is connected to the source through three contact points 10, 12 and 14 of a relay 18 powered by single-phase current from the same source. Relay 18 is connected to the power supply through a starting switch 20, a normally closed stop switch 22, and normally closed contact points 24 of a timer relay 26. Relay 18 also includes contact points 16 connected to provide a by-pass for starting switch 20 so that the operator is not required to hold the starting switch closed to maintain the apparatus in operating condition. The circuit can be rendered inoperative, i.e., disconnected from the power source, at any time merely by opening stop switch 22.

The three-phase power input is connected to a transformer 28 providing current for charging the capacitor while single-phase alternating current is supplied to a control transformer 30 which provides current for operating components of the control portion of the apparatus. The power supply portion of the circuit comprises power transformer 28, a full-wave rectifier designated 32, a bank of capacitors comprising three sets of capacitors designated 34, 36 and 38 connected in parallel to the rectifier through, respectively, switches 35, 37 and 39, a charging resistor 40, and normally open contact points 42 of a charging control relay 44. Relay 44 functions to open and close the charging circuit, and the arrangement of capacitors and switches 35, 37 and 39 allows for various combinations of capacitors to be connected in the capacitor bank in the power supply circuit, thereby providing means for controlling the power supplied to the stud for welding. The welding current power supply also includes a discharge resistor 46 connected across the capacitors through normally closed contact points 48 of discharge relay 50, providing means for discharging the capacitors. A voltmeter 52 is connected across the capacitors for indicating the welding voltage impressed on the capacitors.

The apparatus of the invention differs from the usual capacitor discharge stud welding apparatus, particularly hand-operated (gun) types of welding apparatus, in that the stud-holding device and the clamps or ground for the workpiece are always coupled directly to the capacitor, eliminating the usual welding contactor. This arrangement results in the welding voltage being impressed across the stud and workpiece whenever the apparatus is rendered operative to perform a welding cycle. A welding cycle is commenced by closing a pair of series-connected operating switches 54 and 56. Two switches are provided as a safety measure and are positioned on the apparatus so that the operator is required to use both hands to close these switches and is thereby prevented from touching either the stud or the workpiece during the course of a welding cycle. Closing of switches 54 and 56 supplies current for operating a ground clamp solenoid 58 which controls the operation of the pneumatic device for clamping the workpiece to the welding ground which, in this case, is the positive terminal of the welding capacitor bank. A pilot light 86 is also provided, as shown, across the secondary of control transformer 30 for indicating that starter switch 20 is closed and the apparatus is in operation. Closing of operating switches 54 and 56 also supplies power to discharge relay 50 for opening contacts 48 to remove resistor 46 from the charging circuit. Simultaneously, the circuit to charging control relay 44 is completed, closing contacts 42 and completing the charging circuit from power transformer 28 through rectifier 32, charging resistor 40 and the bank of capacitors 34, 36 and 38.

As previously noted, means are provided for automatically regulating the charge on the capacitors and, in the form shown, comprises a voltage control relay 60 connected across the capacitor bank through a silicon zener diode 62 and a potentiometer 64. Diode 62 is designed to pass current to voltage control relay 60 only when the applied voltage reaches the critical voltage of the zener diode and is characterized by a precisely defined critical voltage at which the current conducted increases very sharply when the critical voltage is exceeded. The critical voltage remains constant so that the current conducted drops off very sharply when the voltage is reduced below the critical voltage. Charging control relay 44 is connected to the control transformer through a normally closed set of contact points 61 controlled by voltage control relay 60, with the result that when the zener diode passes current to the voltage control relay, the latter opens points 61, deenergizing charging control relay 44 and allowing contact points 42 to open, interrupting the charging circuit. The zener diode possesses the desired characteristics of passing no current until the impressed voltage reaches the very accurately predetermined critical voltage of the diode, at which point the diode functions as a very efficient switch to pass current to the voltage control relay. The silicon zener diode is particularly desirable for incorporation in stud welding apparatus of this type because it provides an accurate and economical means for regulating voltage, and features which contribute to its advantages include the fact that its critical voltage remains constant throughout a long series of frequent, repetitive operating cycles essential to a production welding unit and, equally important, the zener diode does not wear out due to usage. While the preferred form of voltage control circuit may include a zener diode, other voltage sensitive means may be employed for passing current to a relay for opening the charging circuit when the desired charge on the capacitor is reached. Such other means include, for example, a thyratron or a voltage sensitive relay. When a voltage sensitive relay is employed, it is provided with contact points connected in series with another relay connected across the secondary of transformer 30. This last-mentioned relay would, in turn, include a pair of normally closed contact points connected in series with charging control relay 44 in lieu of contact points 61 in the circuit described.

Since the critical voltage of the zener diode is not variable, the voltage impressed on the diode must be controlled in order to provide for regulation of the charge on the capacitor. Potentiometer 64 provides means for varying the voltage across the zener diode, making it possible, for example, to obtain a welding voltage range of approximately 80 to 140 volts, employing a silicon zener diode having a critical voltage of about 15 volts and a potentiometer variable between 0 and 1000 ohms.

The circuit for controlling the welding cycles performed by the apparatus includes a timer relay 66 connected to the control transformer through normally closed contact points 45 of charging control relay 44. Relay 66 includes normally closed contact points 68 connected in series with charging control relay 44. Relay 66 is provided for opening points 68 at the end of a delay period to insure that the circuit to the charging control relay 44 remains open. Relay 66 includes a second set of normally open contact points 70 which are closed at the end of the delay period to complete a circuit to a time delay relay 76. Time delay relay 76 includes a first set of contact points 78 which close instantaneously, completing a circuit to solenoid 82 which actuates the pneumatic means (piston and cylinder) coupled with the stud-holding means for moving a stud engaged therein toward the workpiece. Since the stud is already connected to the negative side of the charged capacitor bank, the weld is made automatically when the stud is moved against the workpiece. Time delay relay 76 includes a second set of normally closed contact points 80 connected in series with solenoid 82. Points 80 are opened at the end of a time delay period for deenergizing the solenoid so that the stud-holding means is moved away from the workpiece to its original position in readiness for another cycle.

When a weld is completed, either or both of operating switches 54 and 56 are released, breaking the circuit to ground clamp solenoid 58 to unclamp the workpiece. Release of switches 54 and 56 also deenergizes relay coil 50, closing contact points 48 and thereby connecting discharge resistor 46 across the capacitor bank to bleed off any residual charge prior to introduction of the next stud in the stud-holding means and the next workpiece in the ground clamp in readiness for the next welding cycle.

In order to enable the operator to change the setting of the welding voltage, a normally closed switch 84 is provided in series with solenoid 82. When switch 84 is opened and switches 54 and 56 are closed, the capacitors will charge to their set voltages which the operator can read on voltmeter 52. If it is then desired to change the voltage, switches 54 and 56 are released and potentiometer 64 is rotated to the desired setting. The new voltage may then be read from the voltmeter by depressing switches 54 and 56 to cause the capacitor bank to charge. When the desired setting is obtained, switch 84 is closed, placing the apparatus in readiness for welding operation.

The apparatus includes a number of safety devices designed to turn the apparatus off in the event of any malfunctioning, particularly in the charging circuit, and thereby prevent damage to the components of the apparatus. These safety devices include timer relay 26 which is intended to prevent damage to the components of the charging circuit by turning off the apparatus when contact points 42 remain closed for a period which is longer than the maximum time normally required to charge the capacitors. Timer relay 26 is connected in series with normally open contact points 43 which close instantaneously when charging control relay 44 is energized at the beginning of the charging time. The charging time is normally less than a predetermined number of cycles, for example sixty. Timer relay 26 is set to open points 24 at the end of a delay period equal to the maximum normal charging time, e.g. sixty cycles, and should any malfunction cause contact points 42 to remain closed for longer than this itme (for which timer relay 26 is opening contact points 10, 12, 14 and 16 to turn off the set), points 24 open, breaking the circuit to relay 18, apparatus.

Means are provided for preventing recycling of the apparatus at the end of a welding cycle, that is, means for preventing recharging of the capacitors following discharge thereof to effect the welding of a stud to a workpiece. This means comprises contact points 45 of charging control relay 44 connected in series with timer relay 66. Points 45 open instantaneously when charging control relay 44 is energized at the commencement of a welding cycle by closing of switches 54 and 56. When the capacitor is fully charged, contact points 45 are closed by charging control relay 44, energizing timer relay 66 which, after a delay, opens contact points 68, thereby opening the circuit to charging control relay 44 and preventing the latter from closing contact points 42 to commence another welding cycle. The next successive welding cycle can only be commenced after at least one of switches 54 and 56 has been opened to deenergize timer relay 66. This the operator is required to do in order to manually introduce a stud into the stud holder.

Timer relay 66 performs the additional function of insuring the proper sequence of functions of the apparatus, and for this purpose, includes normally open contact points 70 connected in series with timer relay 76. Contact points 70 are closed, after a delay (at the same time points 68 are opened), the delay being designed to prevent timer relay 76 from closing contact points 78 when the circuit to timer relay 66 is momentarily completed by closing of switches 54 and 56 prior to charging of the capacitors.

The welding current supply and control circuit of the invention can be modified to operate and supply welding current to a plurality of stud welding devices (welding guns) for welding a plurality of studs to a single workpiece. FIG. 2 of the drawing shows a portion of the circuit including means for controlling the operation of four welding guns. The current supply components of the circuit remain essentially the same with the exception that there is provided a separate capacitor or bank of capacitors for each of the four welding guns. The capacitors are connected in parallel, and the welding current voltage is controlled in the manner described by a zener diode-potentiometer combination. In the circuit shown for controlling four guns, timer relay 66 is provided with another set of normally open contact points which control the flow of current to a relay 92, which opens a pair of normally closed contact points connected in series with voltage control relay 60, zener diode 62 and potentiometer 64 when the desired charge on the capacitors is reached. These last-mentioned points are provided to disconnect the voltage control circuit from the capacitors and thereby prevent the charge thereon from being bled off by the voltage control circuit during the operation of the four welding guns. This becomes advisable because the guns are preferably operated successively rather than simultaneously in order to weld the four studs, and the delay between the operation of the first and fourth guns may be of sufficient duration, e.g. forty-five cycles, to permit a significant reduction in the welding current voltage if the capacitors are allowed to be bled by the voltage control circuit.

Contact points 90 also control the flow of current to a first gun dwell timer relay 94, including normally open contact points 96, for completing the circuit to the first gun control solenoid 20. When the first gun control solenoid is energized, the first stud is moved into contact with the workpiece to complete a weld and, after a delay, contact points 97 are opened by relay 94, breaking the circuit to gun control solenoid 20, returning the gun (stud-holding means) to its original position. Simultaneously with the opening of contact points 96, contact points 98 are closed by relay 94, completing the circuit to a second gun dwell timer relay 100, including contact points 102, which close immediately to complete the circuit to a second gun control solenoid 22 which actuates the second gun for moving the second stud into contact with the workpiece to make a weld. After a delay, contact points 103 are opened by relay 100 to deenergize gun control solenoid 122 and contact points 104 are closed, completing a circuit to a third gun dwell timer relay 106, which includes normally open contact points 108 and normally closed contact points 112, connected to a third gun control solenoid 124 and normally open contact points 110 for completing a circuit to a fourth gun dwell timer relay 114, which includes normally open contact points 116 for completing a circuit to a fourth gun control solenoid 126 and normally closed contact points 118 for opening the circuit to the fourth gun control solenoid at the end of a delay period. Third and fourth gun dwell timer relays 106 and 114, together with their respective contact points, operate in the same manner as first and second gun dwell timer relays 94 and 100 to operate guns 3 and 4 in succession to weld the studs mounted therein and return the third and fourth guns to their original positions.

Normally closed switches 128, 130, 132 and 134 are provided for disconnecting the gun solenoids 120, 122, 124 and 126 from the circuit to allow the operator to vary the charge on the capacitors in the manner previously described. In this connection, switches 128, 130, 132 and 134 perform substantially the same function as switch 84.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Capacitance discharge stud welding apparatus comprising, in combination, means for holding a stud and moving said stud into contact with a workpiece to which said stud is to be welded; a capacitor charging circuit, including a capacitor, a source of direct current for charging said capacitor, and a switch for opening the charging circuit between said capacitor and said source of direct current; a welding circuit, including said capacitor connected between the first-mentioned means for holding said stud and a ground for said workpiece; and a control circuit for controlling the charging of said capacitor and for automatically rendering said first-mentioned means operative to move said stud into contact with said workpiece to weld said stud to said workpiece when the charge on said capacitor reaches a predetermined value, said control circuit comprising, connected in series, said capacitor, a relay operative by current from said capacitor to open said switch and then render said first-mentioned means operative, a zener diode for passing current from said capacitor to said relay to operate the latter when the voltage across said diode reaches the predetermined critical voltage thereof, and a resistance variable for determining the charge on said capacitor at which said zener diode passes current to said relay.

2. Capacitance discharge stud welding apparatus comprising, in combination, means for holding a stud and moving said stud into contact with a workpiece to which said stud is to be welded; a capacitor charging circuit, including a capacitor and a source of direct current for charging said capacitor; a welding circuit, including said capacitor connected between the first-mentioned means for holding said stud and a ground for said workpiece; a capacitor charging control circuit, including said capacitor, relay means operative, when energized by current from said capacitor for opening said charging circuit, and voltage sensitive means for passing current from said capacitor to said relay means to energize the latter when the charge on said capacitor reaches a predetermined value; and an operating control circuit, including said relay means and means responsive to energization of said relay means for rendering said first-mentioned means operative to move said stud into contact with said workpiece following opening of said charging circuit.

3. The stud welding apparatus of claim 2 wherein said voltage sensitive means comprises a zener diode.

4. The stud welding apparatus of claim 2 wherein said voltage sensitive means is operative to regulate the charge on said capacitor within a range of values and comprises a variable resistance connected in series with a zener diode for providing means for controlling the voltage across said capacitor at which the critical voltage of said diode is exceeded and current is passed to said relay means.

5. The stud welding apparatus of claim 2 wherein said operating and capacitor charging control circuits include means for preventing recharging of said capacitor following welding of said stud to said workpiece and prior to introduction of another stud into said first-mentioned means for holding a stud, the last-mentioned means comprising second relay means energized by the operation of the first-mentioned relay means for holding said charging circuit open following welding of said stud to said workpiece.

6. Capacitance discharge stud welding apparatus comprising, in combination, means for holding a stud and moving said stud into contact with a workpiece to which said stud is to be welded; a capacitor charging circuit, including a capacitor and a source of direct current for charging said capacitor; a welding circuit, including said capacitor, the first-mentioned means for holding said stud, and a ground for said workpiece connected in series; and a control circuit, including said capacitor, control means including a relay for rendering said first-mentioned means operative to move said stud into contact with said workpiece, and voltage sensitive means for passing current from said capacitor to energize said relay when the charge on said capacitor reaches a predetermined value.

7. The stud welding apparatus of claim 6 wherein said control means includes means for opening said charging circuit and thereafter rendering said first-mentioned means operative to move said stud into contact with said workpiece.

8. The stud welding apparatus of claim 6 wherein said voltage sensitive means comprises a zener diode.

9. The stud welding apparatus of claim 6 wherein said voltage sensitive means comprise a voltage sensitive relay operated by current from said capacitor.

10. The stud welding apparatus of claim 6 wherein said voltage sensitive means are operative by current from said capacitor to regulate the charge on said capacitor within a range of values and comprise a variable resistance connected in series with a zener diode.

References Cited in the file of this patent

UNITED STATES PATENTS

| | | |
|---|---|---|
| 2,510,101 | Graham | June 6, 1950 |
| 2,816,209 | Blackmer | Dec. 10, 1957 |
| 2,845,523 | Ramson | July 29, 1958 |
| 2,903,625 | Doerpinghaus | Sept. 8, 1959 |